(12) United States Patent
Gorbatov et al.

(10) Patent No.: US 6,658,147 B2
(45) Date of Patent: Dec. 2, 2003

(54) RESHAPING FREEHAND DRAWN LINES AND SHAPES IN AN ELECTRONIC DOCUMENT

(75) Inventors: Boris Gorbatov, Sunnyvale, CA (US); Ilia Lossev, Mountain View, CA (US)

(73) Assignee: Parascript LLC, Niwot, CO (US)

( * ) Notice: Subject to any disclaimer, the term of this patent is extended or adjusted under 35 U.S.C. 154(b) by 0 days.

(21) Appl. No.: 10/123,708

(22) Filed: Apr. 15, 2002

(65) Prior Publication Data

US 2002/0150297 A1 Oct. 17, 2002

Related U.S. Application Data

(60) Provisional application No. 60/284,075, filed on Apr. 16, 2001.

(51) Int. Cl.[7] .................................................. G06K 9/46
(52) U.S. Cl. ....................... 382/202; 348/443; 348/468; 382/187; 382/190; 382/203
(58) Field of Search ................................. 382/187, 203, 382/190; 348/441–443, 468, 863, 953

(56) References Cited

U.S. PATENT DOCUMENTS

| | | | | |
|---|---|---|---|---|
| 4,933,865 A | * | 6/1990 | Yamamoto et al. | 382/203 |
| 5,425,109 A | * | 6/1995 | Saga et al. | 382/187 |
| 5,636,297 A | * | 6/1997 | Eller et al. | 382/293 |
| 5,926,567 A | * | 7/1999 | Collins et al. | 382/187 |
| 6,057,845 A | * | 5/2000 | Dupouy | 345/358 |
| 6,424,746 B1 | * | 7/2002 | Nishida | 382/195 |

OTHER PUBLICATIONS

PCT International Search Report for PCT/US02/26221.
http://www.eetimes.com/storyOEG20001127S0034;
*E–commerce comes to portable apps;* Greg Simon et al.; EE Times; Nov. 27, 2000.

\* cited by examiner

*Primary Examiner*—Timothy M. Johnson
*Assistant Examiner*—Gregory Desire
(74) *Attorney, Agent, or Firm*—Merchant & Gould P.C.

(57) ABSTRACT

The invention improves the appearance of freehand drawn lines and shapes in an electronic document by first recognizing freehand drawn lines and shapes and generating a line made up of sequential straight line segments for the freehand drawn line when the line does not form a closed line and generating a multiple straight-line-segment shape when the line forms a closed line. If a multiple segment shape is being reshaped, a basic shape is selected from reference ideal shapes as the basic shape of the multiple segment shape. The basic shape is adjusted to provide a specific shape as an improved shape for the freehand drawn shape. The recognition of the freehand drawn lines and shapes is accomplished by comparing source segments of a source freehand drawn line to a straight line and substituting a straight line segment for a source segment if the deviation between the source segment and the straight line is below a predetermined value. Sequential source segments of a source freehand drawn line are evaluated to determine if they are an angle segment. A segment pair of sequential source line segments are defined as an angle segment having two straight line segments intersecting at a common end point if both source segments of the segment pair are within a predetermined deviation value from a straight line. The straight line segments and angle segments are combined to form a multiple segment line if the line does not close on itself and a multiple segment shape if the line does close on itself.

17 Claims, 8 Drawing Sheets

RESHAPING FREEHAND DRAWN LINES AND SHAPES IN AN ELECTRONIC DOCUMENT

RELATED APPLICATIONS

This application claims the benefit of priority of U.S. provisional application Ser. No. 60/284,075, filed Apr. 16, 2001.

FIELD OF THE INVENTION

This invention relates to the reshaping of freehand drawn lines and shapes in an electronic document. More particularly the invention relates to automatically straightening line segments in a line and to reshaping closed-line shapes.

BACKGROUND OF THE INVENTION

With the increasing use of stylus and touch sensitive screens to input lines and images into a computer, one problem that has arisen is the poor quality of the freehand drawn lines and shapes, and the resulting difficulty in interpreting the user input. Further there are a number of other difficulties in processing freehand sketched lines and images. First, it is difficult to determine whether a freehand sketched line, that would typically not be straight, is a multiple-segment line with successive segments at angles to each other (a polyline) or is a single straight segment. Further, polysided shapes are often so irregular that the freehand drawing looks sloppy at best and may not be understandable at all by user or computer. The problem then is how to improve a freehand sketch of a line or shape so it may be more clearly understood by the user or any computing system processing the drawings.

SUMMARY OF THE INVENTION

In accordance with this invention the above and other problems have been solved by first recognizing freehand drawn lines and shapes and generating a line made up of sequential straight line segments for the freehand drawn line when the line does not form a closed line and generating a multiple straight-line-segment shape when the line forms a closed line. A basic shape is selected from reference ideal shapes as the basic shape of the multiple segment shape. The basic shape is adjusted to provide a specific shape as an improved shape for the freehand drawn shape.

The recognition of the freehand drawn lines and shapes is accomplished by comparing source segments of a source freehand drawn line to a straight line and substituting a straight line segment for a source segment if the deviation between the source segment and the straight line is below a predetermined value. Sequential source segments of a source freehand drawn line are evaluated to determine if they are an angle segment. A segment pair of sequential source line segments are defined as an angle segment having two straight line segments intersecting at a common end point if both source segments of the segment pair are within a predetermined deviation value from a straight line. The straight line segments and angle segments are combined to form a multiple segment line if the line does not close on itself and a multiple segment shape if the line does close on itself.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF PREFERRED EMBODIMENTS

The logical operations of the various embodiments of the present invention are implemented (1) as a sequence of computer implemented steps, or acts, or as program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, steps, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
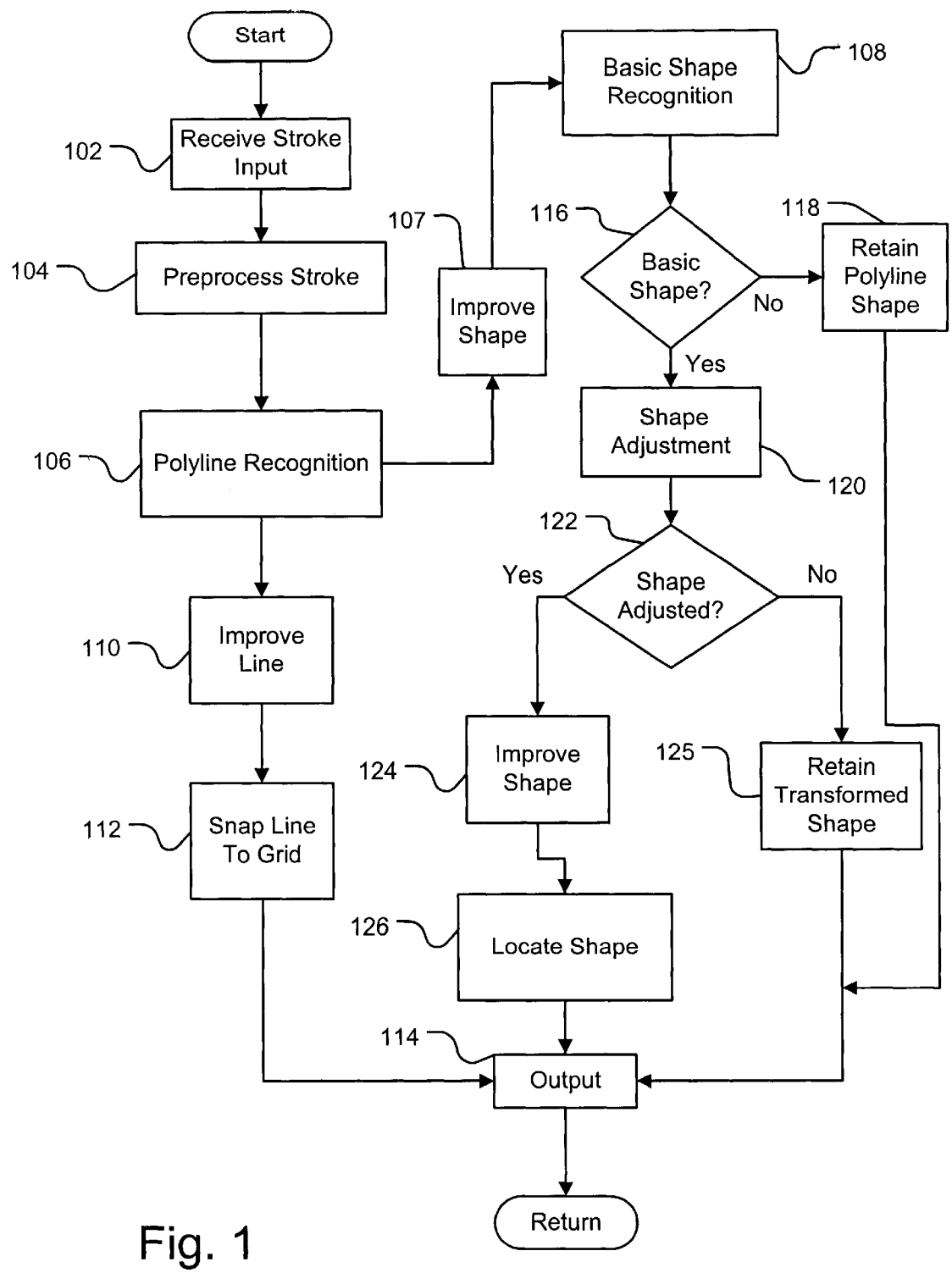
FIG. 1 shows one embodiment of the invention to improve the appearance of freehand drawn lines and shapes.

In one embodiment of the invention as illustrated in FIG. 1, the shape improvement operational flow begins with receive operation 102 receiving the stroke input or, electronic ink input, data. Electronic ink refers to stroke information in the form of sequential X,Y coordinate locations occupied by elements or points of the stroke. The stroke is entered by hand with pen or stylus on touch screen or by mouse or similar device controlling a cursor on a computer display screen. The electronic ink may, but need not, include vector information (direction and velocity of stroke). In other words, electronic ink is a digital representation of a stroke as a series of X,Y point locations rather than an image representation of black and white picture elements (pels) on a page. The electronic ink representation may be compressed, stored, transmitted and received.

The electronic ink input data is made up of X,Y coordinates of points located along the path of the stroke. In addition to the X,Y coordinates, velocity information may also be a part of the electronic ink input data. For example, a digitized input of X,Y coordinates from a mouse would provide X,Y coordinates every 1/40th of a second. The distance traveled by a stroke between two X,Y coordinate positions in a fixed interval of time gives the velocity of the stroke between the two positions. This stroke input information, the X,Y coordinates plus velocity information, is passed to a stroke preprocess operation 104.

The stroke preprocessing operations may include data filtering or data extrapolation and may make use of the X,Y coordinates and/or the velocity information. After preprocessing is completed, the output from the preprocessing operation 104 is stroke information defined as a sequence of X,Y coordinates representing successive points along the line to be recognized and reshaped as a polyline or as a shape. This stroke information is passed to a polyline line recognition operation 106. Polyline as used herein refers to a line that may be visualized as one or more straight line segments sequentially connected together. If the successive segments are in-line the polyline would be a single straight line. Of course, if the series of segments are not in-line they might form any contour such as a saw tooth, a hook, a right angle, an acute angle, an obtuse angle or sequential combinations thereof. When a polyline closes on itself it forms a shape.

Polyline recognition module 106 analyzes an input line as a series of segments that are either straight segments or angular segments. Straight segments are defined by two points, i.e., the X,Y coordinates of the point at each end of the segment. Angular segments are defined by three points, i.e., the outside end points of 2 straight segments and a common end point where the segments are connected at an angle to each other. The polyline recognition module 106 sequentially analyzes all segments of the line and improves the sketch of the polyline into a sequence of straight segments. The polyline recognition module concludes by testing whether the line closes on its self, i.e., forms a shape, or is open, i.e., multiple segments of a line. If the line closes on itself, the operation flow passes from the polyline recognition module 106 to improve shape operation 107. Improve shape operation 107 constructs the polyline shape from straight segments and angular segments determined during the polyline recognition module 106. The polyline shape is passed to the shape recognition operation 108. If the polyline does not close on itself, the operation flow branches to the improve line operation 110. The polyline recognition module will be described in more detail hereinafter in reference to FIG. 3.

The improve line operation 110 receives the serial combined segments from the polyline recognition process and constructs the polyline from straight segments and angular segments determined during the polyline recognition module 106. The improved line data is then passed to the locate operation 112. Locate operation 112 snaps the polyline to an X,Y grid on the virtual screen that maps to the computer display screen. The line data for the improved polyline is then output through output operation 114 to be rendered on the display screen.

The handling of a closed polyline, i.e. a polyline shape, begins at the basic shape recognition module 108. In module 108 the straight segment and angular segment information received from the polyline recognition, which defines a polyline shape, is analyzed to recognize the polyline shape as a basic reference shape such as ellipse, triangle, quadrangle, pentagonal, etc. If the polyline shape is recognized by basic shape recognition module 108 as being one shape from a set of basic ideal shapes, the polyline shape is improved by substituting for it a transformed basic ideal shape that is the most similar to the polyline shape. One embodiment of the basic shape recognition module 108 is described hereinafter with reference to FIG. 7.

Basic shape test operation 116 tests whether the shape was recognized and improved to the reference shape. If the shape was not distinct enough to be recognized, the operation flow branches NO to retain polyline shape operation 118. Retain operation 118 simply retains the polyline shape from improve shape operation 107 and passes it to the output operation 114 to be rendered on the display screen. When the polyline shape is recognized and improved to a transformed basic shape, the basic shape test operation 116 will branch the operational flow YES to shape adjustment module 120. The transformed basic shape from operation 108 is passed onto a shape adjustment module 120.

Figure 8:
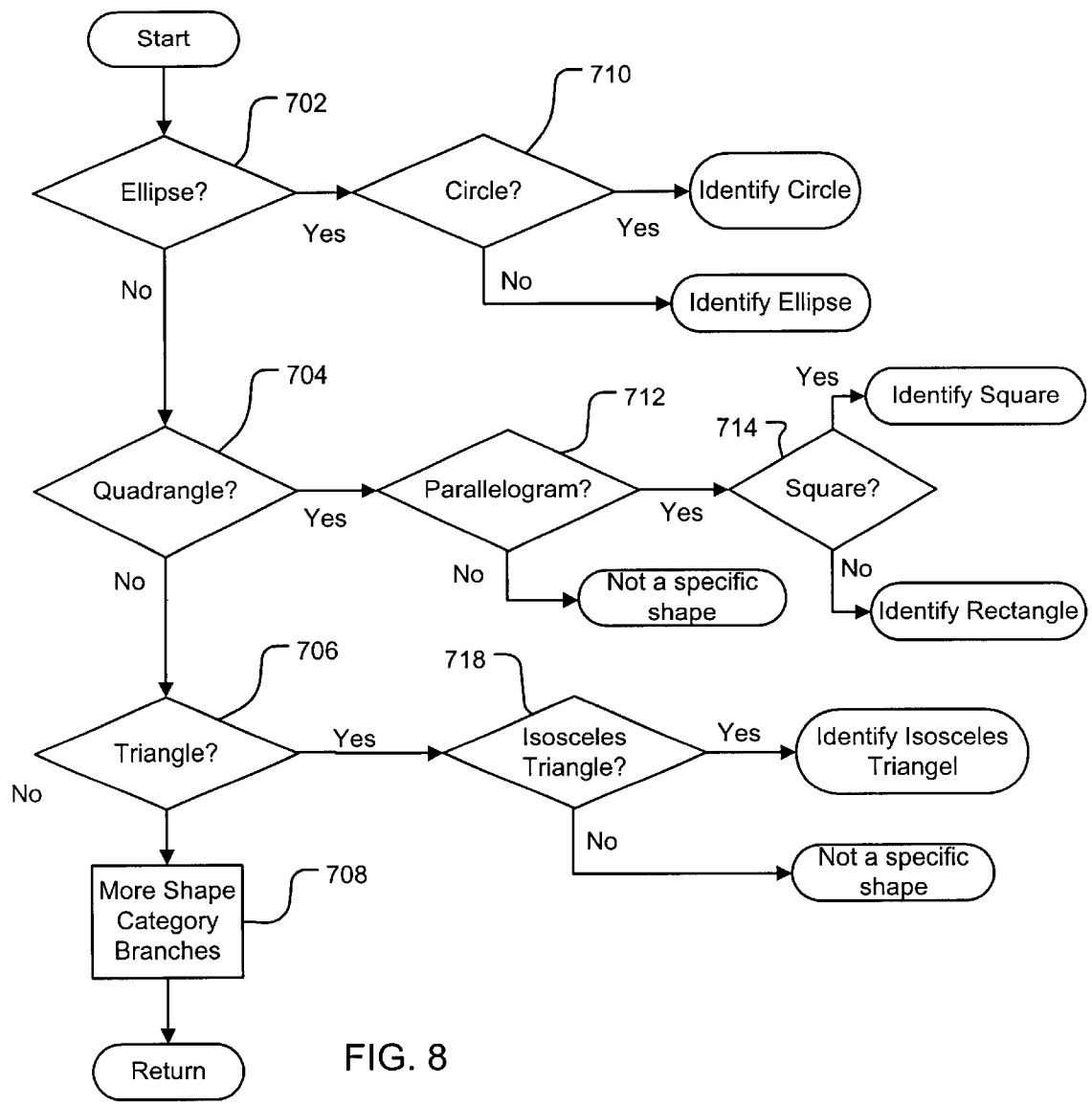
FIG. 8 illustrates the operational flow of the shape adjustment module 120 in FIG. 1.

The shape adjustment module 120 in one embodiment is a logical tree for comparing the transformed shape against more specific shapes that are logical extensions of the basic shape. In other words if the basic shape is a quadrangle, the transformed shape will be tested against a parallelogram. If it is a parallelogram, it will be tested against a rectangle or square shape. If it is not a parallelogram, it will be tested against a trapezoid shape. If that fails, it will be compared to other four-segment shapes not having any sides parallel. If a specific shape is identified by this logical process, the transformed shape will be improved to this specific shape in improve shape operation 124. The size of the tree and the number of reference common shapes is a matter of choice. An exemplary embodiment of the shape adjustment operation is shown in FIG. 8 and will be described in more detail hereinafter with reference to that figure.

Adjustment test operation 122 detects whether a specific shape was identified by the shape adjustment operation 120. If the shape was not identified, the operation flow branches NO to the retain transformed shape operation 125. The transformed basic shape is then retained and sent out by output operation 114. If adjustment test operation 122 detects that the shape was identified as a specific shape, the operation flow branches YES to the improve shape operation 124. Improve shape operation 124 receives the transformed shape segments and angles and improves the transformed shape identified during the shape adjustment operation. Once the shape has improved the operation proceeds to location operation 126 that snaps the improved shape to the grid of a virtual screen. The location and shape information is then output through output operation 114 to be rendered on the display screen.

Figure 2:
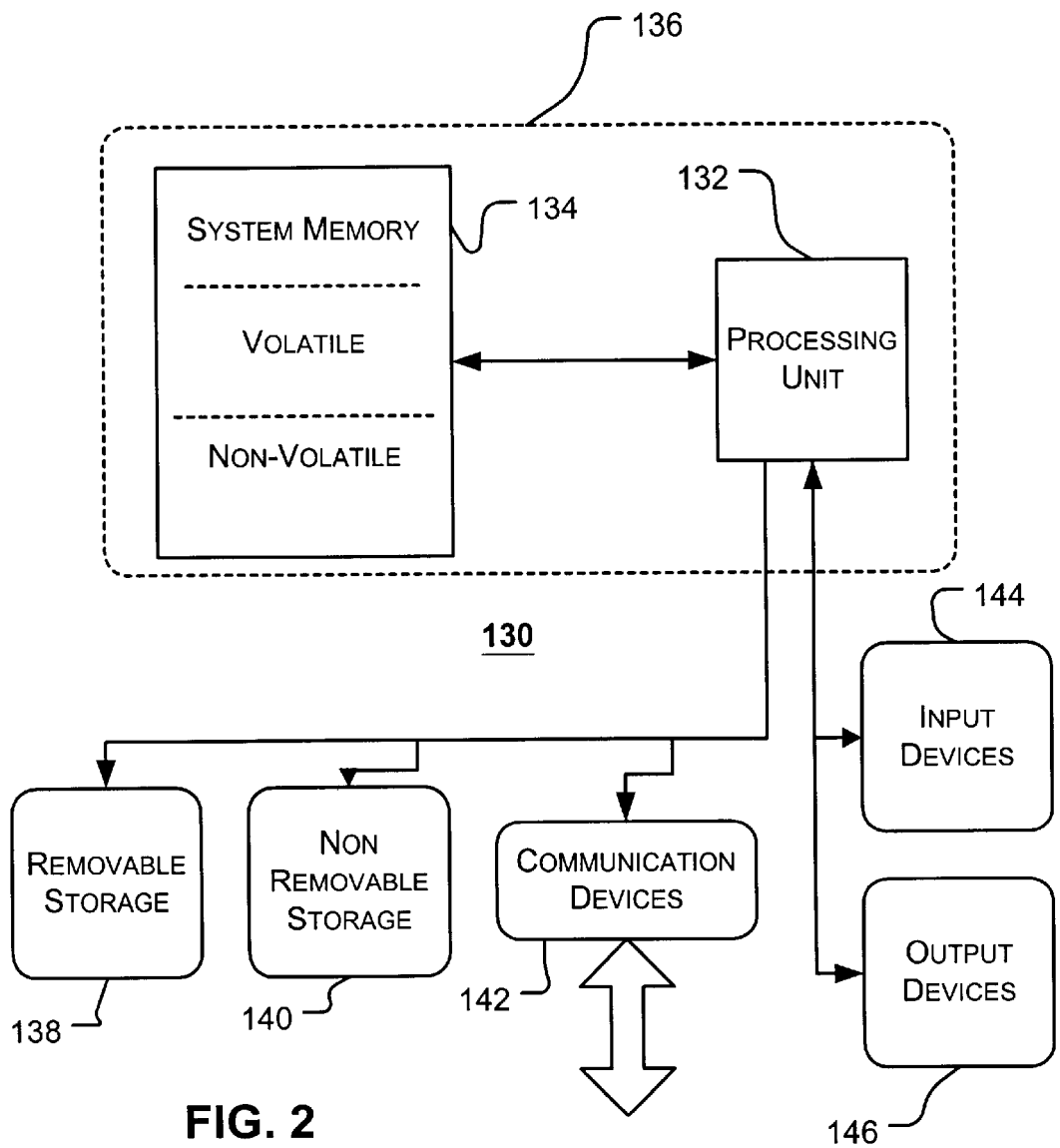
FIG. 2 shows an exemplary computing system that may used to implement the operations of the invention.

An exemplary system for implementing the invention is the computing system 130 in FIG. 2. The implementation of the invention could include two or more such computing systems configured in a server/client computing network. One example is shown and described in patent application Ser No. 10/123,733, entitled "Providing Hand-Written and Hand-Drawn Electronic Mail Service." Of course the invention could also be implemented in a stand alone computing system if the invention were applied to improving hand drawn shapes in an electronic document in a stand alone computing system.

In its most basic configuration, computing system 130 typically includes at least one processing unit 132 and memory 134. Depending on the exact configuration and type of computing system, memory 134 may be volatile (such as RAM), non-volatile (such as ROM, flash memory, etc.) or some combination of the two. This most basic configuration is illustrated in FIG. 2 by dashed line 136. Additionally, system 130 may also include additional storage (removable and/or non-removable) including, but not limited to, magnetic or optical disks or tape. Such additional storage is illustrated in FIG. 2 by removable storage 138 and non-removable storage 140. Computer storage media includes volatile and nonvolatile, removable and non-removable media implemented in any method or technology for storage of information such as computer readable instructions, data structures, program modules or other data. Memory 134, removable storage 138 and non-removable storage 140 are all examples of computer storage media. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 130. Any such computer storage media may be part of system 130.

System 130 may also contain communications devices 142 that allow the system to communicate with other systems. Communications devices 142 send and receive communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. The term computer readable media as used herein includes both storage media and communication media.

System 130 may also have input device(s) 144 such as keyboard, mouse, pen, stylus, voice input device, touch input device, etc. Output device(s) 146 include display, speakers, printer, etc. All these devices are well known in the art and need not be discussed at length here.

Figure 3:
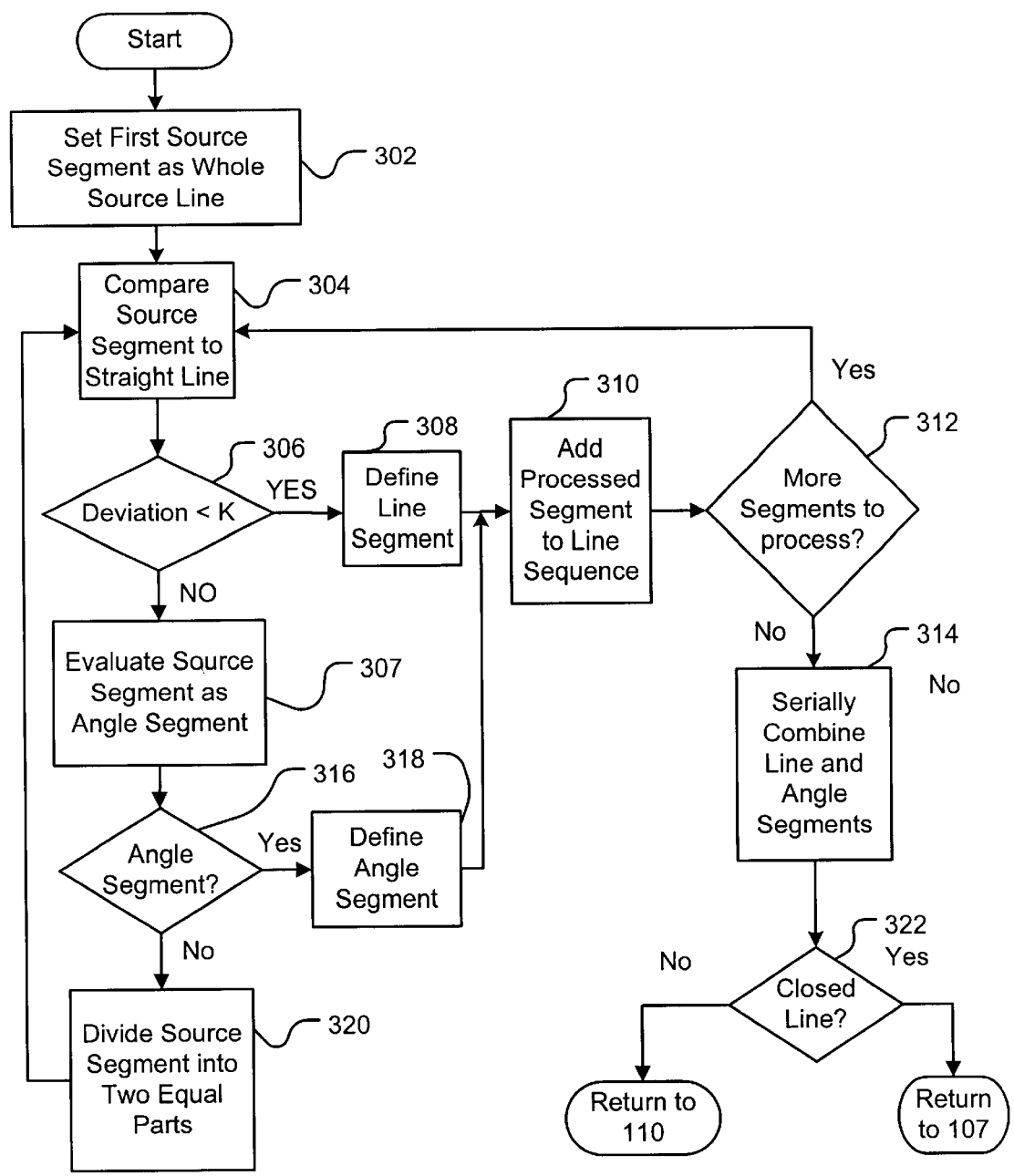
FIG. 3 illustrates the operational flow for the polyline recognition module 106 in FIG. 1.

In FIG. 3 the details of the polyline recognition module are shown. The polyline recognition module begins at set operation 302 that sets the entire input line or whole source line as the first source segment to be analyzed. Compare operation 304 takes this freehand input line and compares it to a straight line. Compare operation 304 will generate a deviation value along the input line measuring the input line's deviation from the straight line. In one preferred embodiment the two end points of the input line are connected by a straight line, and the root mean square of the difference between the input line and the straight line along the length of the input line is computed. If this deviation value is not less than a threshold value K, deviation test operation 306 branches the operation flow NO to angle segment evaluate operation 307. If the deviation value is less than a threshold value K, the operation flow branches YES from deviation test operation 306 to define line segment operation 308. Operation 308 defines the line segment as a straight line between the X,Y coordinate positions of the end points of the line segment.

Sequence operation 310 receives the line segment definition from operation 308 and adds the line segment to line sequence data for the complete line. This whole line sequence data is composed of a combination of line segments and angle segments unless the source line is one straight line. End point X,Y addresses of sequential line and angle segments in the sequence of segments are the connection points to make up the complete line. Angle segments may be defined as two line segments connected at a point of intersection with an angle other than 180° between them and having end points at the ends of the line segments opposite the point of intersection. Alternatively, an angle segment can be defined with three points or X,Y coordinate addresses—the point of intersection, or point of the angle within the angle segment, and the two end points of the angle segment away from the point of intersection.

After the processed line segment or angle segment is added to the line sequence data by operation 310, more segments test operation 312 detects whether there are more segments to be processed or the entire source line has been processed. If the whole source line has a deviation value less than K, the whole source line is processed as a line segment, and there would be no more segments to process. In such a case the operation flow would branch NO to the combine segment operation 314. Typically however, there will be additional segments to process, and the operation flow will branch YES to return to the compare source segment operation 304. Compare operation 304 then compares the next source segment to be analyzed against a straight line for that segment.

If the deviation value for the source segment is not less than K as detected at deviation test operation 306, then the operation flow branches NO to the angle segment evaluate operation 307. Operation 307 is described hereinafter in detail with reference to FIG. 4. The angle segment evaluate operation analyzes the source segment as an angle segment having two connected straight line segments connected at an angle to each other (where the angle is not 180°; i.e. the segments don't make a single straight line). If the source segment does not fit this model, the angle segment evaluate operation will not be successful. This could happen where there are multiple angles occurring in the source segment as for example in a saw tooth path or a gradually curving path. In other words, any path for the source segment that cannot be approximated by two straight lines connected at an angle to each other. Angle segment test operation 316 tests whether the angle segment evaluation was a success. If the evaluation was successful, the operation flow branches YES to operation 318 to define the angle segment as described above. If the angle segment evaluation is not successful, the operational flow branches NO from test operation 316 to divide segment operation 320. Divide segment operation 320 splits the source segment under evaluation into two equal segment parts, i.e. two new source segments. The operation flow branches back to operation 304 to compare the first of these new source segments to a straight line. Thus, the operation flow continues in FIG. 3 until all source segments have been processed and added to the line sequence data either as a line segment or an angle segment.

When there are no more segments to be processed as detected in more segments test operation 312, the combined segments operation 314 combines all of the line segments and angle segments in the line sequence. The combined segments operation is described hereinafter with reference to FIG. 5. After the combined segments operation, a "closed line" test operation 322 tests whether the combined segments have formed a closed line; i.e. the line has connected back to itself and thus enclosed a space. If a closed line is not detected then the operation flow branches NO to improve line operation 110 in FIG. 1. If the combined segments operation has formed a closed line, then the operation flow branches YES from FIG. 3 closed line test operation 322 to improve shape operation 107 in FIG. 1.

Figure 4:
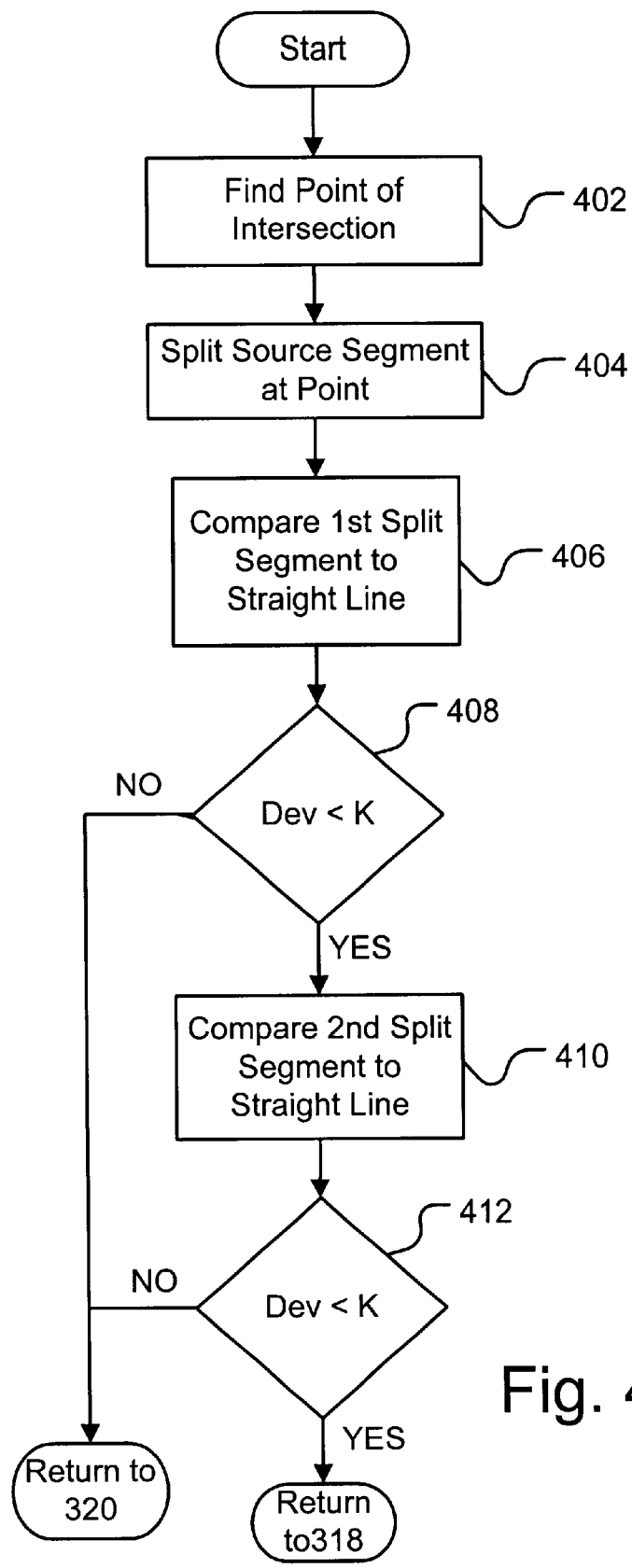
FIG. 4 shows the operational flow of evaluate operation 306 in FIG. 3.
Figure 5:
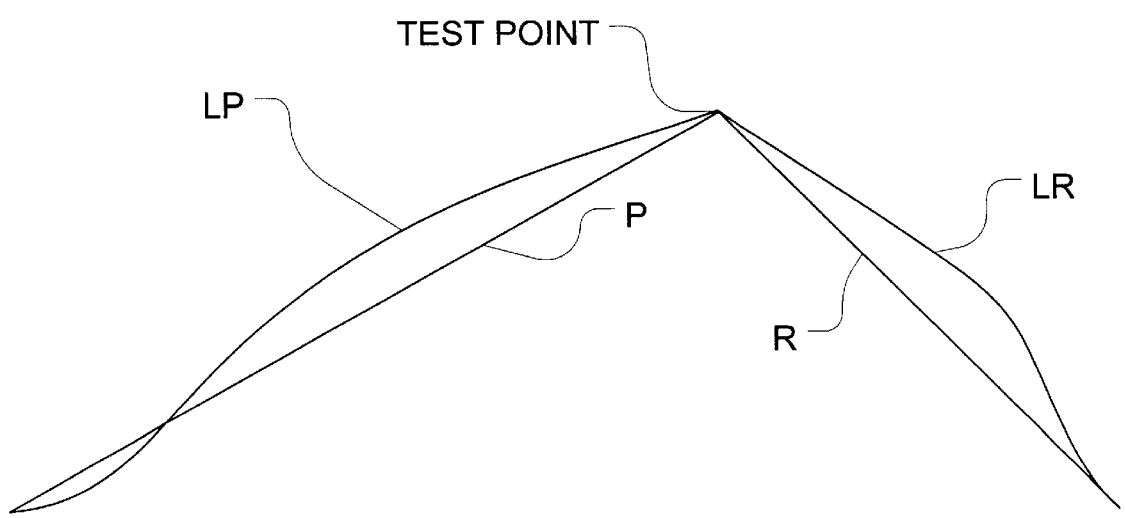
FIG. 5 illustrates an example of a segment pair to be evaluated as an angle segment by the operations of FIG. 4.

In FIG. 4, the angle segment evaluation module or operation 307 and the angle segment test operation 316 (FIG. 3) are shown in detail. This evaluate operation determines whether the source segment being examined is an angle segment. In FIG. 4, the operational flow of the angle segment evaluation module begins at find operation 402 finding the point of intersection for the angle segment. The find operation 402 is accomplished by a test that compares (1) the straight-line distance from both end points to a test point to (2) the lengths along the actual angle segment portions from both end points to the test point. First, the straight-line distances from both end points to the test point are computed. In FIG. 5 the straight-line distances are designated P and R. Also, the actual lengths of the angle segment portions from both end points to the test point are computed based on the paths of the segment portions. These actual lengths are designated LP and LR. The test is repeated for all points along the angle segment. In this test, the point of intersection for the angle in the angle segment will be the test point where there is the minimum deviation between P and LP and a minimum deviation between R and LR. The expression $(LP/P-1)^2+(LR/R-1)^2$ will reach minimum value at the point of intersection for the angle in the angle segment.

After the point of intersection is determined, the operational flow passes to split operation 404 that divides the source segment into two split segments at the point of intersection. Compare operation 406 then compares one of these split segments to a straight line. First split segment test operation 408 tests whether the deviation for the first split segment from a straight line is less then K. If the deviation is not less than K, the angle segment under evaluation has more than one angular point of intersection. In other words the first split segment cannot be approximated as a straight line, and there must be at least one angular point in the first split segment in addition to the angle point already found. Therefore the angle segment evaluation has failed, and the operation flow branches NO to divide operation 320 in FIG. 3 where the source segment under test is divided into two new segments for further processing.

If the deviation of the first split segment of the source segment is less than K, then this first segment on one side of the angle point is a straight line. Compare operation 410 then compares the second or other segment to a straight line. If the second segment is a straight line, the second segment split test operation 412 will detect a deviation less than K. In this event the angle segment evaluation has been successful as the preceding operations have detected that the source segment can be approximated by two straight segments intersecting at a single angle point. Now the operational flow branches YES from second split segment test operation 412 to define angle segment operation 318 (FIG. 3).

On the other hand, if the second split segment on the other side of the angle point is not a straight line, the deviation detected by second split segment test operation 412 will not be less than K. In this event the source segment must have at least one angle point in the second split segment in addition to the angle point find between the first and second split segments. Now the angle segment evaluation and test has not been successful, i.e. has not confirmed an angle segment, and the operation flow branches NO to divide source segment operation 320 (FIG. 3).

Figure 6:
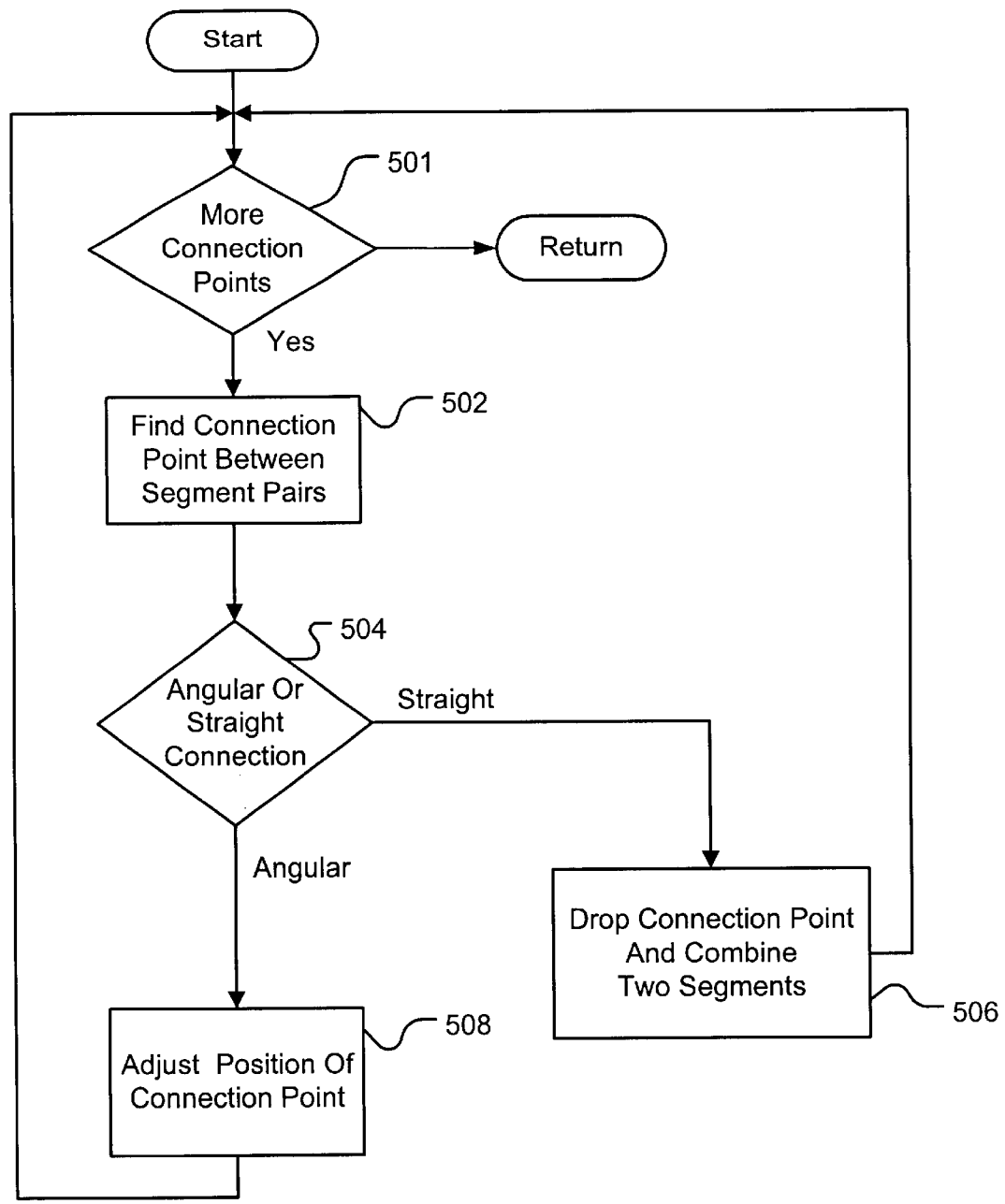
FIG. 6 illustrates the operations performed by the combine segments module 314 in FIG. 3.

FIG. 6 illustrates the combined segments operation 314 in FIG. 3. After the line segments and angle segments have been accumulated in the line sequence data by operation 310 in FIG. 3, the sequential segments must be connected to create the reshaped line. In FIG. 6 the operational flow begins with more connection points test operation 501 detecting whether there are more connection points in the line sequence data. If there are more connection points to be processed, the operation flow branches YES to find operation 502 which finds the connection point between sequential segments in the line sequence data. Find operation 502 searches for a common end point between two sequential segments. After the connection point between the segment pairs (adjacent segments) has been found then test operation 504 tests whether the connection is straight or angular. If the angle between the segments at the connection is less than a few degrees from 180°, the connection is threshold in degrees (for example 180°±3°) for determining that the connection is straight is a matter of choice and can be programmed into the test operation 504 to accomplish the appearance the user is looking for in reshaping the line.

In the event of a straight connection the operational flow branches to drop connection operation 506. In operation 506 the connection point is simply dropped, and the end points for the combined segments are the outside end points of the segment pair away from the connection point. Effectively two adjacent segments, the segment pair, become one segment.

If the angle between the two segments is not close to 180 degrees, i.e. is not within the test threshold, there is an angle between the segment pair and the connection is determined to be angular. When the connection is angular, then adjust operation 508 adjusts the position of the connection point between the segment pair, i.e. the two adjacent segments connected at the connection point. To adjust the connection point, an operation, which is the same as find operation 402 described with reference to FIGS. 4 and 5, is used by operation 508 to find the correct intersection point and thereby adjust the connection point between the two segments. After the position of the connection point is adjusted, the flow returns to more connection points test operation 501. After all connection points have been processed the test operation 501 detects that there are no more connection points to be handled. The operation flow branches NO and returns to closed line test operation 322 in the polyline process in FIG. 3.

Figure 7:
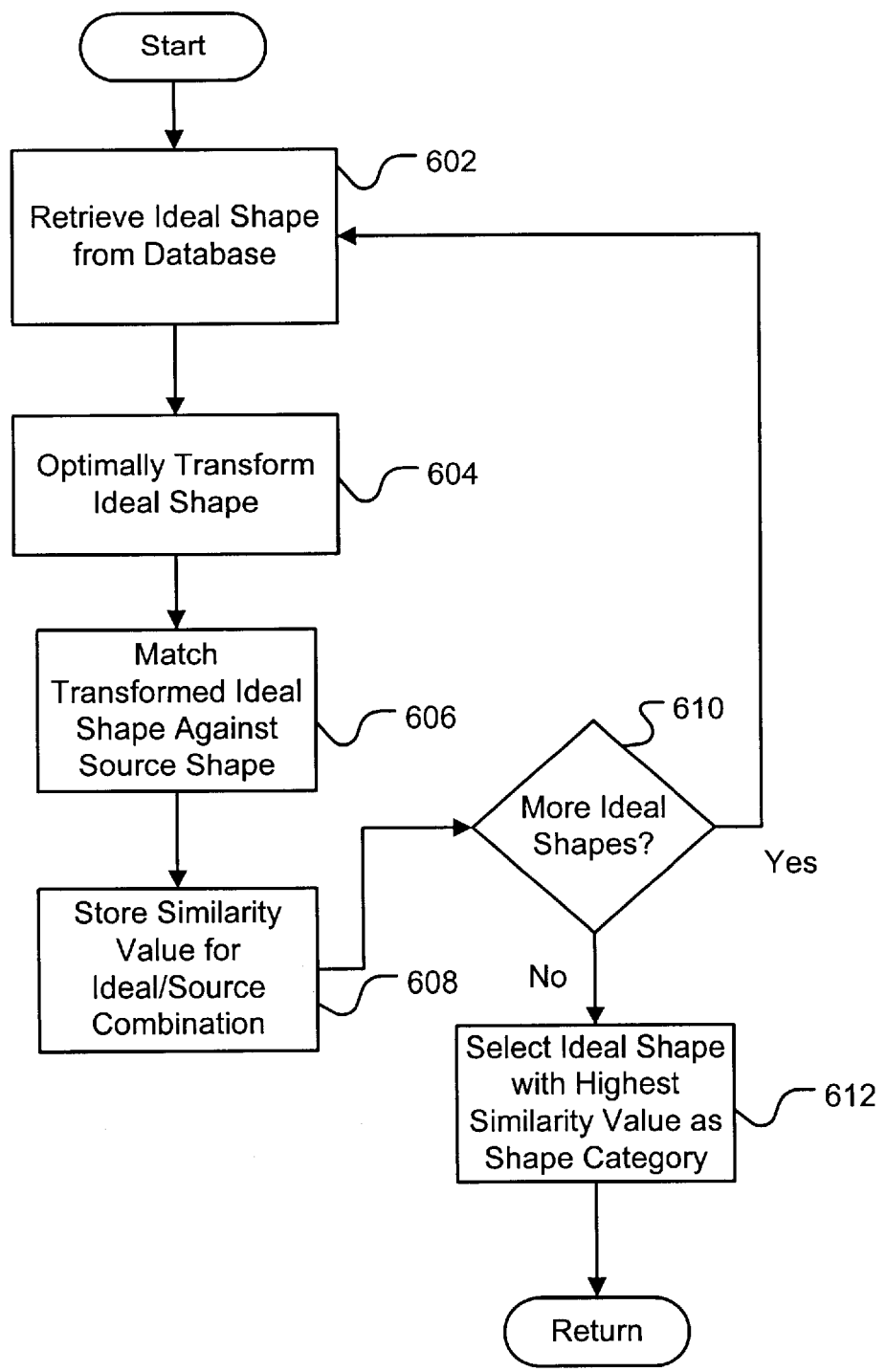
FIG. 7 shows the operations performed by the basic recognition module 108 in FIG. 1.

FIG. 7 illustrates one embodiment of the basic shape recognition module 108 in FIG. 1. These operations begin at operation 602 which retrieves a reference ideal shape from a database containing a plurality of reference ideal shapes. The reference ideal shapes will be the basic shapes—ellipse, triangle, quadrangle, pentagon, etc. The retrieved, or reference, ideal shape is transformed in transform operation 604 to a shape for comparison against the polyline shape to be recognized. This transformation is based on finding the best affine transformation which translates the points of the ideal shape into points of the polyline shape. For example, a quadrangle ideal shape would be adjusted in size and orientation of its segments to better match polyline shape such as a circle, triangle, rectangle or a trapezoid, etc. Once the ideal shape has been changed to a transformed shape, the transformed shape is matched against a source shape and a similarity value is scored for the match. Of course, a quadrangle transformed shape will compare poorly against a polyline shape that is a circle, a triangle, or any other shape not a quadrangle. More ideal shapes test operations 610 then test whether there are more reference ideal shapes to be matched against the polyline shape. If there are, the operational flow returns to the retrieve operation 602. Each source shape, i.e. polyline shape, will be compared against all reference shapes such as, circle or elliptical, triangle, quadrangle, pentagon, etc. Once all ideal shapes have been transformed and matched against the polyline shape, the operation flow branches NO from test operation 610 to select operation 612. The select operation 612 selects the transformed ideal shape with the highest similarity value from all of the matches. This transformed shape is the output of the basic shape recognition operation 108 in the FIG. 1, and the operation flow in FIG. 7 returns to basic shape test operation 116 in FIG. 1.

Referring now to FIG. 8, the shape adjustment module 120 of FIG. 1 is illustrated. FIG. 8 shows the operation flow through tree logic for identifying the basic shape as a specific shape. The logical tree operation flow first detects the basic type or category of the transformed shape recognized at module 108 (FIG. 1). Ellipse test 702, quadrangle test 704, triangle test 706 and more shape categories 708 are the trunk of the tree If the transformed basic shape was an ellipse, the operation flow branches to circle test operation 710. Circle test identifies the transformed shape as a circle or ellipse. If the transformed shape is a quadrangle, parallelogram test 712 passes the transformed shape to square test 714 if successful. Square test identifies the shape as square or rectangle. If test 712 is not successful, no specific shape is identified. Similarly if the transformed formed basic shape is a triangle, isosceles test 718 identifies the shape as an isosceles triangle, or no specific shape. If the transformed basic shape is not identified as a specific shape then the shape adjustment test 122 (FIG. 1) will detect failure. It will be appreciated by one skilled in the art that the branches in this logic are exemplary and any number of basic shapes and specific shapes could be used in many other embodiments of the invention.

In another embodiment of the invention, the shape adjustment module would test the angles or sides in the transformed shape and make automatic adjustments if the sides are within a few degrees of the X, Y grid or the angles are within a few degrees of angles in standard or common shapes. In other words, the angles might be adjusted to right angles or 60° angles or 45° angles. In another example, the parallelism of opposite sides might be compared or the parallelism of a side to a grid might be compared. If the sides or the side to grid were close to parallel, the sides or side to grid would be adjusted to be parallel.

In another embodiment of the invention, the ellipse and circle would be processed somewhat differently from the above described embodiments of the basic shape recognition module. In this embodiment, the ellipse would be measured against the polyline shape along multiple circumferential points for example 30+ points. The difference between or separation between transformed ellipse and polyline shape would be measured to determine similarity.

While the invention has been particularly shown and described with reference to preferred embodiments thereof, it will be understood by those skilled in the art that various other changes in the form and details may be made therein without departing form the spirit and scope of the invention.

We claim:

1. A system for reshaping freehand drawn lines and shapes in a computing system having a display and a pointing device for drawing lines and shapes on the display, the system comprising:

a polyline recognition module analyzing freehand drawn lines and shapes and generating a polyline made up of sequential straight line segments when the polyline does not form a closed line and generating a polyline shape when the polyline forms a closed line;

a basic shape recognition module responsive to the polyline recognition module and selecting a basic shape from reference ideal shapes as the basic shape of the polyline shape; and a shape adjustment module responsive to the basic shape recognition module and adjusting the basic shape to provide a specific shape as an improved polyline shape;

said polyline recognition module comprises:

a straight line compare module comparing segments of a source line to a straight lien and defining a segment as a line segment if the difference between the source line and the straight line is below a predetermined value;

an evaluate module analyzing segment pairs as an angle segment and defining a segment pair as an angle segment if both segments of the segment pair are within a predetermined deviation from a straight line; and a combine module combining line segments from the straight line compare module and angle segments from the evaluate module to generate a polyline or polyline shape.

2. The system of claim 1 wherein the polyline recognition module further comprises:

a closed line detect module determining whether the combined line segments from the combine module form a polyline or a polyline shape.

3. The system of claim 1 wherein the basic shape recognition module comprises:

a transform module transforming the reference ideal shapes into transformed shapes relative to the polyline shape;

a comparison module matching each transformed shape to the polyline shape and storing a similarity value for each transformed shape indicating similarity between the polyline shape and the transformed shape;

a selection module selecting the transformed shape with the highest similarity value as the basic shape of the poly line shape.

4. The system of claim 3 wherein said shape adjustment module comprises:

a test module identifying a specific shape from the basic shape.

5. The system of claim 3 wherein said shape adjustment module comprises:

angle adjustment module changing angles of segments in the basic shape to standard angles for a specific shape;

line segment adjustment module adjusting the parrallelism of line segments and line segments relative to a horizontal and vertical grid line.

6. Apparatus for improving the appearance or freehand drawn lines and shapes displayed in an electronic document, said apparatus comprising:

means for recognizing freehand drawn lines and shapes and generating a line made up of sequential straight line segments for the freehand drawn line when the line does not form a closed line and generating a multiple straight-line-segment shape when the line forms a closed line;

means responsive to the multiple straight-line-segment shape for selecting a basic shape from reference ideal shapes as the basic shape of the freehand drawn shapes; and means responsive to the basic shape for adjusting the basic shape to provide a specific shape as an improved shape for the freehand drawn shape;

said means for recognizing comprises:

means for comparing segments of a source freehand drawn line to a straight line and defining a segment as a straight line segment if the deviation between the segment of source line and the straight line is below a predetermined value;

means for evaluating sequential source segments of a source freehand drawn line as an angle segment and defining a segment pair of sequential straight line segments as an angle segment if both source segments of the segment pair are within a predetermined deviation value from a straight line; and means for serially combining straight line segments and angle segments to form a multiple segment line or a multiple segment shape.

7. The system of claim 6 wherein said means for selecting comprises:

means for transforming the reference ideal shapes into transformed shapes similar to the multiple segment shape;

means for matching each transformed shape to the multiple segment shape and storing a similarity value for each transformed shape indicating similarity between the multiple segment shape and the transformed shape;

a selection module selecting the transformed shape with the highest similarity value as the basic shape of the freehand drawn shape.

8. The system of claim 7 wherein said means for adjusting comprises:

means for identifying a specific shape from the basic shape.

9. The system of claim 7 wherein said means for adjusting comprises:

means for changing angles of segments in the basic shape to standard angles for a specific shape;

means for set line segments parallel to each other or to one of a horizontal and vertical grid line.

10. A computer program product readable by a computing system and encoding a computer program of instructions for executing a computer process for improving the appearance of freehand drawn lines and shapes, said computer process comprising:

recognizing freehand drawn lines and shapes and generating a line made up of sequential straight line segments for the freehand drawn line when the line does not form a closed line and generating a multiple straight-line-segment shape when the line forms a closed line;

selecting a basic shape from reference ideal shapes as the basic shape of the multiple segment shape;

adjusting the basic shape to provide a specific shape as an improved shape for the freehand drawn shape;

said act of recognizing comprises:

comparing source segments of a source freehand drawn line to a straight line and substituting a straight line segment for a source segment if the deviation between the source segment and the straight line is below a predetermined value;

evaluating sequential source segments of a source freehand drawn line as an angle segment and defining a segment pair of sequential source line segments as an angle segment having two straight line segments intersecting at a common end point if both source segments of the segment pair are within a predetermined deviation value from a straight line; and combining straight line segments and angle segments to form a multiple segment line or a multiple segment shape.

11. The computer program product of claim 10 wherein said act of selecting comprises:

transforming the reference ideal shapes into transformed shapes similar to the multiple segment shape;

matching each transformed shape to the multiple segment shape and storing a similarity value for each transformed shape indicating similarity between the multiple segment shape and the transformed shape; and selecting the transformed shape with the highest similarity value as the basic shape of the freehand drawn shape.

12. The program product of claim 11 wherein said act of adjusting comprises:

identifying a specific shape from the basic shape.

13. The program product of claim 11 wherein said act of adjusting comprises:

changing angles between line segments in the basic shape to standard angles for a specific shape;

setting line segments parallel to each other or to one of a horizontal and vertical grid line.

14. A method for improving the appearance of freehand drawn lines and shapes, said method comprising:

recognizing freehand drawn lines and shapes and generating a line made up of sequential straight line segments for the freehand drawn line when the line does not form a closed line and generating a multiple straight-line-segment shape when the line forms a closed line;

selecting a basic shape from reference ideal shapes as the basic shape of the multiple segment shape;

adjusting the basic shape to provide a specific shape as an improved shape for the freehand drawn shape;

said act of recognizing comprises:

comparing source segments of a source freehand drawn line to a straight line and substituting a straight line segment for a source segment if the deviation between the source segment and the straight line is below a predetermined value;

evaluating sequential source segments of a source freehand drawn line as an angle segment and defining a segment pair of sequential source line segments as an angle segment having two straight line segments intersecting at a common end point if both source segments of the segment pair are within a predetermined deviation value from a straight line; and combining straight line segments and angle segments to form a multiple segment line or a multiple segment shape.

15. The method of claim 14 wherein said act of selecting comprises:

transforming the reference ideal shapes into transformed shapes similar to the multiple segment shape;

matching each transformed shape to the multiple segment shape and storing a similarity value for each transformed shape indicating similarity between the multipe segment shape and the transformed shape; and selecting the transformed shape with the highest similarity values as the basic shape of the freehand drawn shape.

16. The method of claim 15 wherein said act of adjusting comprises:

identifying a specific shape from the basic shape.

17. The method of claim 15 wherein said act of adjusting comprises:

changing angles between line segments in the basic shape to standard angles for a specific shape;

setting line segments parallel to each other or to one of a horizontal and vertical grid line.

* * * * *

UNITED STATES PATENT AND TRADEMARK OFFICE
CERTIFICATE OF CORRECTION

PATENT NO. : 6,658,147 B2
DATED : December 2, 2003
INVENTOR(S) : Gorbatov et al.

It is certified that error appears in the above-identified patent and that said Letters Patent is hereby corrected as shown below:

Drawings,
Figure 8, "Triangel"; should read -- Triangle --

Column 10,
Line 6, "lien" should be -- line --
Line 45, "parrallelism" should be -- parallelism --

Column 12,
Line 53, "multipe" should be -- multiple --

Signed and Sealed this

Twenty-second Day of June, 2004

JON W. DUDAS
*Acting Director of the United States Patent and Trademark Office*